US006997621B2

(12) United States Patent
Saitou et al.

(10) Patent No.: US 6,997,621 B2
(45) Date of Patent: Feb. 14, 2006

(54) METHOD FOR FIXATION OF OPTICAL FIBER IN OPTICAL DEVICE MODULE, AND FIXATION PIPE

(75) Inventors: Tsutomu Saitou, Tokyo (JP); Minoru Shinozaki, Tokyo (JP); Tooru Sugamata, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 8 days.

(21) Appl. No.: 10/650,588

(22) Filed: Aug. 28, 2003

(65) Prior Publication Data

US 2004/0228585 A1    Nov. 18, 2004

(30) Foreign Application Priority Data

Aug. 30, 2002  (JP) .............................. 2002-254937
Mar. 25, 2003  (JP) .............................. 2003-082030

(51) Int. Cl.
*G02B 6/26*    (2006.01)
*G02B 6/42*    (2006.01)

(52) U.S. Cl. .......................................... 385/91; 385/94
(58) Field of Classification Search ............. 385/88–94
See application file for complete search history.

(56) References Cited

U.S. PATENT DOCUMENTS

| 4,708,429 A | * | 11/1987 | Clark et al. ................... 385/91 |
| 4,787,695 A | * | 11/1988 | Laor ............................ 385/78 |
| 6,088,504 A | * | 7/2000 | Filas et al. ................... 385/138 |
| 6,826,328 B1 | * | 11/2004 | Hwang et al. ................ 385/33 |
| 2003/0108288 A1 | * | 6/2003 | Bulman et al. ............... 385/37 |

FOREIGN PATENT DOCUMENTS

| JP | 01309011 A | * | 12/1989 |
| JP | 07151937 A | * | 6/1995 |

* cited by examiner

*Primary Examiner*—Michelle Connelly-Cushwa
(74) *Attorney, Agent, or Firm*—Chapman and Cutler LLP

(57) ABSTRACT

A method for fixation of optical fiber in an optical device module, and a fixation pipe, the method of fixation comprising the steps of utilizing a fixation pipe configured for insertion of the optical fiber, and adapted for affixation of the fiber by solder in an intermediate part of the pipe, the external surface of the intermediate part having a groove for a copper bit; installing the pipe to the case so that the intermediate part is positioned outside the case; inserting the fiber inside the pipe so that a stripped part of the fiber is in the intermediate part, and a coated part of the fiber is positioned opposite to the case from the intermediate part; and contacting a copper bit to the groove, to affix the fiber to the pipe by solder. The fixation pipe has the features described above.

15 Claims, 3 Drawing Sheets

Fig. 1                                    Prior Art
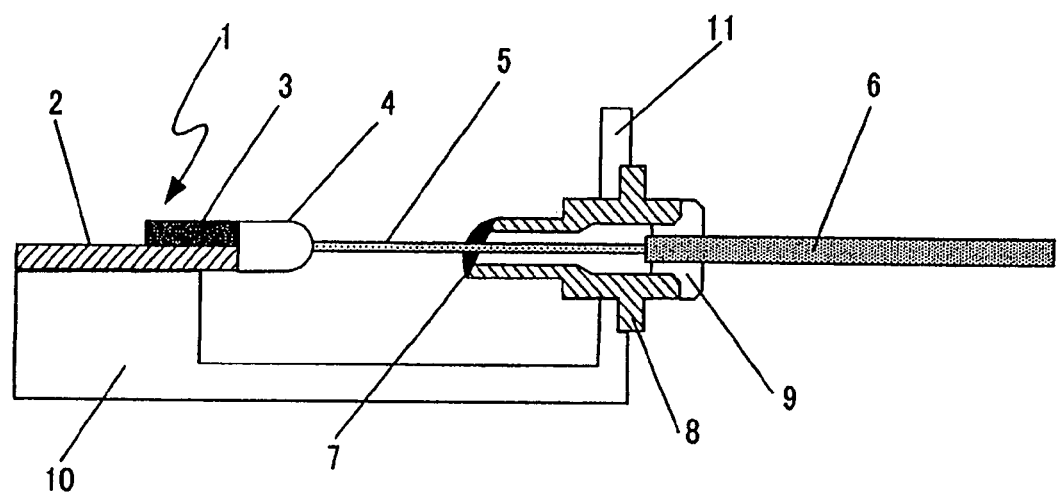
Fig. 2
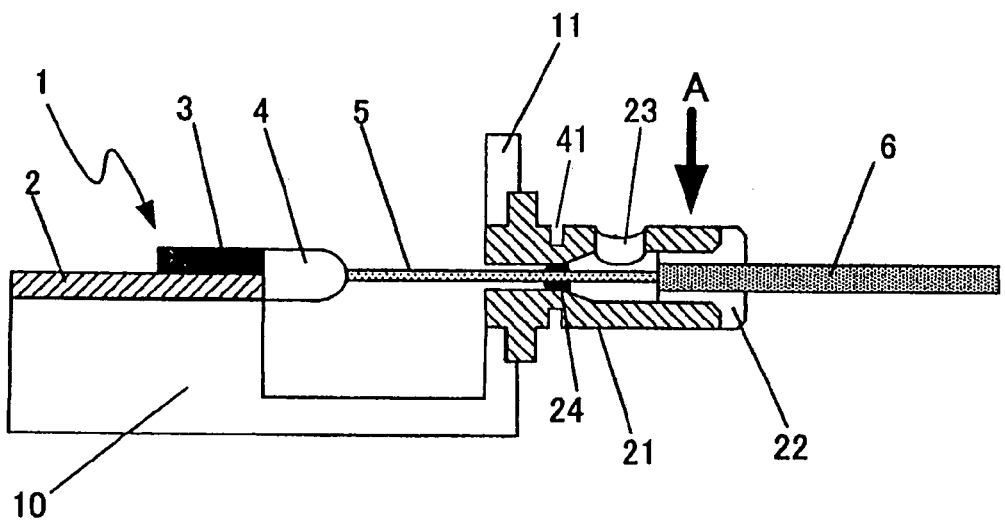

Fig. 3
(a)
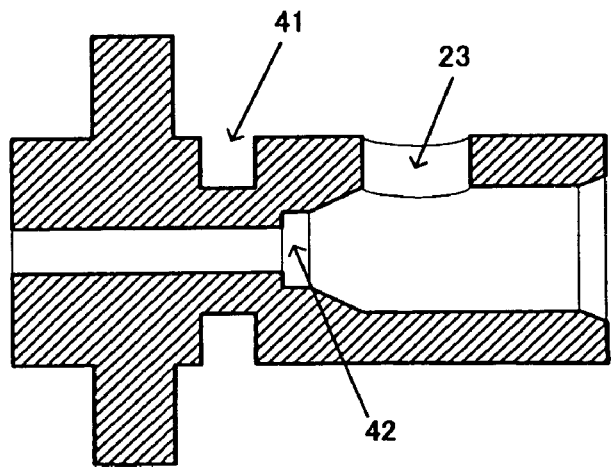
(b)
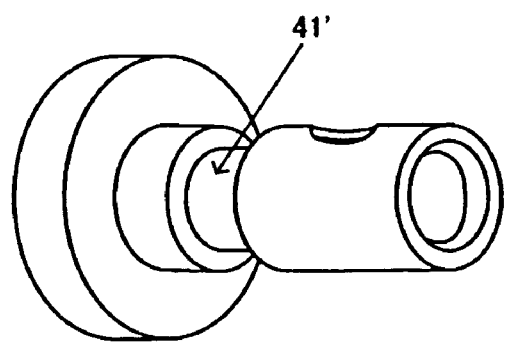
(c)
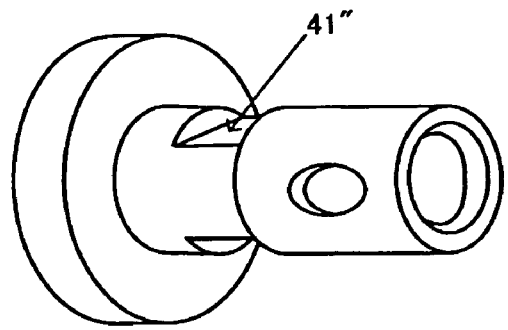

METHOD FOR FIXATION OF OPTICAL FIBER IN OPTICAL DEVICE MODULE, AND FIXATION PIPE

BACKGROUND OF THE INVENTION (1) Field of the Invention

The present invention relates to a method for fixation of optical fiber in an optical device module and a fixation pipe. In particular, it relates to a method and a fixation pipe for fixation of optical fiber in an optical device module, which has the narrowed interior space between an optical modulator, which is an optical element, and the case incorporating it, such as an optical modulator module.

(2) Related Art Statement

Corresponding to the increasing demand for recent high-speed and high-capacity information communication, dense wavelength division multiplexing (DWDM) of optical networking has been adopted more and more. Accordingly it is necessary to utilize a multitude of optical elements, such as an optical modulator, by combining them. Particularly it is required to prevent expansion of the whole equipment by miniaturizing each part of the optical device module that incorporates these optical elements, and make the whole equipment compact.

To miniaturize the optical device module, the miniaturization of the case that determines the outer shape of optical device module is needed, and to say nothing of miniaturizing the optical element itself, the distance between the optical element and the side plate of the case has to be shortened.

On the other hand, as to the optical device module, it is necessary to combine optically the optical element incorporated into the case with the optical fiber installed from the outside of the case, and therefore, in the part where the optical fiber penetrates the side plate of the case, the optical fiber is fixed, and for the purpose of sealing the inside of the case, the optical fiber is fixed by means of a solder.

FIG. 1 shows the conventional example of the method for fixation of optical fiber in the optical device module, concerning said nodule incorporating an optical modulator that is an optical element. For the sake of comprehensible coupling structure, FIG. 1 shows only the condition of the optical element 1 and the optical fiber 5 that are adjacent to the side plate 11 of the case 10.

The optical modulator 1 consists of the chip 2, on which an optical circuit, such as an optical waveguide, is formed, and the stiffening plate 3 for assisting in the binding of said chip 2 and the capillary 4. The capillary 4 is the member that makes the optical fiber 5 penetrated and retained, and the capillary 4 and the optical modulator 1, and the capillary 4 and the optical fiber 5, respectively, are joined together after optical positioning.

The optical modulator 1 is fixed to the inside of the case 10 that is to compose a module, and the optical fiber 5 penetrates the side plate 11 of the case 10 and is derived to the outside of the case. Normally the side plate of the case 11 is equipped with the fixation pipe 8 for fixing optical fiber, and the optical fiber 5 is configured to penetrate into said fixation pipe 8 further. Also, to position the optical fiber in the fixation pipe, with the coated part of the optical fiber 6 sandwiched by the sleeve (divided sleeve) 9 that is divided into two (it is divided into above and below in FIG. 1), said divided sleeve is inserted to the fixation pipe 8.

Furthermore, the optical fiber 5 is fixed at the tip of the fixation pipe 8 by means of the solder 7 and keeps the inside of the case 10 in sealing condition. In order to assist in the fixation like this of the optical fiber by the solder 7, a metallization processing is performed on the surface of the optical fiber 5, and accordingly, the adhesiveness with solder gets improved.

Likewise, as to the fixation of the optical fiber by the solder in a case, due to the sticking fixation pipe 8 inside the case, it is impossible to locate the optical modulator 1 that is an optical element, and the side plate of the case 11 closer to each other than the fixed distance and it makes it difficult to miniaturize the optical device module.

Moreover, as the fixation pipe and the optical fiber are fixed by using a solder, it is essential to position a copper bit and the solder to the appropriate place of the fixation pipe when fixing the optical fiber.

In addition, the coated part 6 consisting of the materials, such as polyethylene and nylon, is installed in the optical fiber 5 to protect the optical fiber, and in case of fixing the optical fiber by a solder outside of the case, there has been a problem that the heat of said solder is transferred to said coated part and it makes the coating materials transformed, and accordingly, the function as coated part gets deteriorated.

SUMMARY OF THE INVENTION

In order to achieve the above-described objects, the invention related to claim 1 has following features. The method for fixation of optical fiber in the optical device module connecting a case incorporating the optical device module and the optical fiber installed from the outside of said case into said optical device, comprises using a fixation pipe, into which said optical fiber is inserted, and which can fix said optical fiber by a solder in the intermediate part of inserting direction, the external surface of which has a groove for copper bit; setting said fixation pipe to said case in order that said intermediate part may be located on the outside of said case; placing said optical fiber inside said fixation pipe in order that the strip part, where the coated part of said optical fiber is removed, may be located in said intermediate part, at least, and the coated part of said optical fiber may be located somewhere in between said intermediate part and the opposite side of said case; and contacting a copper bit with said groove for copper bit and fixing said optical fiber to the fixation pipe by a solder.

In accordance with the invention related to claim 1, as the joint by a solder is located outside the case, there is no unnecessary sticking fixation pipe inside the case and it enables the adjacent positioning of the optical element and the side plate of the case, and further, miniaturization of the optical device module.

Moreover, albeit fixed by a solder inside the fixation pipe, operators can distinguish easily the place where the copper bit is contacted with the fixation pipe since the groove for copper bit is formed on the fixation pipe, and therefore, the copper bit is in no danger of moving in the direction of the coated part of optical fiber during operation. In addition, as the copper bit and the solder are located closer to each other because of said groove for copper bit and it is possible to conduct the heat of the copper bit to the solder efficiently, the operating efficiency is improved further.

In addition, the invention related to claim 2 has following feature. The method for fixation of optical fiber in the optical device module, as claimed in claim 1, comprises that a planing for alignment of solder is formed on the internal surface of said intermediate part of the fixation pipe and, in fixing said optical fiber to the fixation pipe by a solder, said solder is located on said planing.

In accordance with the invention related to claim 2, albeit fixed by a solder inside the fixation pipe, since the planing for positioning of the solder is formed in the fixation pipe, it is possible to position the solder appropriately at any time and operators can carry out the solder-fixing operation efficiently.

In addition, the invention related to claim 3 has following feature. The method for fixation of optical fiber in the optical device module, as claimed in claim 1 or 2, comprises that, in fixing said optical fiber to the fixation pipe by a solder, the opposite side of said case from said intermediate Part is refrigerated.

In accordance with the invention related to claim 3, in case of jointing the fixation pipe and the optical fiber by means of a solder, it is possible to block the transmission of the heat of the solder to the coated part of the optical fiber and prevent the deterioration of said coated part.

The invention related to claim 4 has following feature. The method for fixation of optical fiber in the optical device module, as claimed in claim 3, comprises that said method of refrigerating is performed by contacting endothermic member with said fixation pipe.

In accordance with the invention related to claim 4, only by bringing the endothermic member into contact with the fixation pipe, it is made possible to let out the heat of the solder to said endothermic member. Therefore, without adding any specific changes to the case, the fixation pipe, etc, the prevention of the deterioration of the coated part of the optical fiber is possible with simple structure. Further, since said endothermic member is just contacting with the fixation pipe, after the solder-fixing operation, it is possible to remove said endothermic member if necessary and it does not impede the miniaturization or optical device module at all.

The invention related to claim 5 has following feature. The method for fixation of optical fiber in the optical device module, as claimed in claim 4, comprises that said endothermic member has the structure for clipping said fixation pipe.

In accordance with the invention related to claim 5, since the endothermic member has clipping structure, it is possible to insert or pull the endothermic member easily into and from the fixation pipe and to achieve the improvement in operating efficiency of solder fixation.

In addition, the invention related to claim 6 has following feature. The method for fixation of optical fiber in the optical device module, as claimed in claim 3, comprises that said method of refrigerating is performed by blowing compressed air to said fixation pipe.

In accordance with the invention related to claim 6, as the fixation pipe is refrigerated locally by compressed air, it enables refrigeration without condition of contact with the fixation pipe. Therefore, it eliminates the negative effect such as harming the fixation pipe by mechanical load, and furthermore, as it is unnecessary to insert or pull an aid such as the above-described endothermic member, further improvement in operation efficiency will be achieved.

In addition, the invention related to claim 7 has following feature. The method for fixation of optical fiber in the optical device module, as claimed in claims 1 to 6, comprises that solder fusion is performed by electrifying the fixation pipe with said copper bit.

In accordance with the invention related to claim 7, since the fixation pipe is electrified by the copper bit and the solder is fused by Joule heat generated from said electrifying, the solder itself dose not become high temperature, and operators are at low risk, such as of hurting themselves by mistake. Also, there is no danger of the products becoming defective as the copper bit is connected to an unnecessary part.

Further, as the groove for copper bit is formed, the value of resistance of the fixation pipe becomes locally high, and therefore, it is possible to generate Joule heat intensively around said groove.

In addition, the invention related to claim 8 has following feature. The fixation pipe for fixing the optical fiber an optical device module connecting a case incorporating an optical element, and the optical fiber installed from the outside of said case into said optical element, comprises that the planing for alignment of the solder that is formed on the internal surface of said fixation pipe, and the groove for copper bit that is formed on the external surface of said fixation pipe, are located outside said case in setting said fixation pipe to the case.

In accordance with the invention related to claim 8, by using said fixation pipe, since the joint by the solder is located outside the case, there is no unnecessary sticking fixation pipe into the case, and it presents the possibility of locating the optical-element and the side plate of the case closer to each other. Therefore it is also possible to miniaturize the optical device module, and further, the operation efficiency will be improved in that alignment of solder or copper bit becomes easier, etc.

In addition, the invention related to claim 9 has following feature. The fixation pipe, as claimed in claim 8, comprises an opening formed adjacent to said planing.

In accordance with the invention related to claim 9, thorough said opening, it is possible to identify the position of a ring-shaped solder visually, and further, to adjust the position of the solder if necessary. Therefore more accurate/preferable operation will be achieved.

BRIEF DISCRIPTION OF THE DRAWINGS

FIG. 1 is a diagram showing the structure adjacent to the side plate of the case of the conventional optical device module.

FIG. 2 is a diagram showing the structure adjacent to the side plate of the case of the optical device module of the present invention.

FIG. 3 a diagram showing the shape of the fixation pipe.

Figure 4:
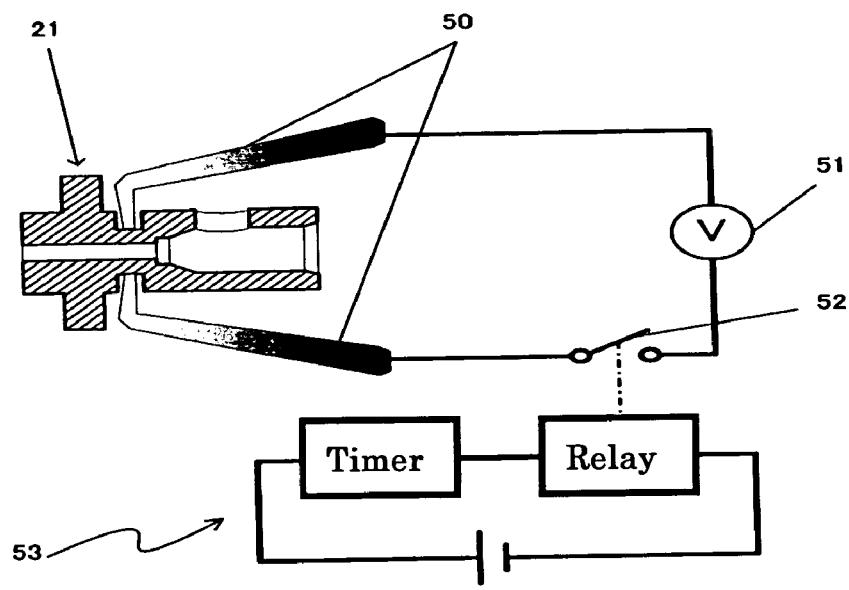

FIG. 4 is a diagram showing the method for fixation using a catalytic current copper bit.

Figure 5:
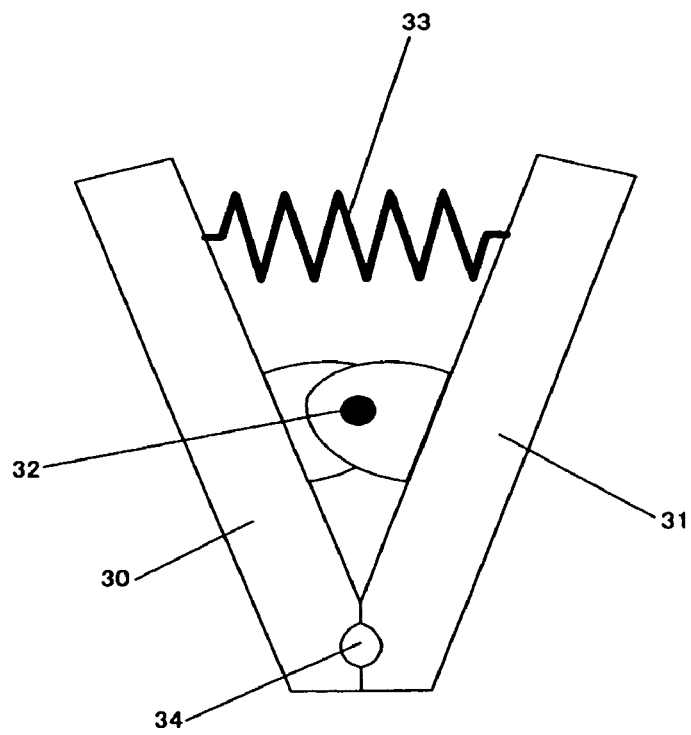

FIG. 5 is a diagram showing the structure of endothermic member.

EXPLANATIONS OF NUMERALS

1 Optical modulator
2 Chip
3 Stiffening plate
4 Capillary
5 Optical fiber
6 Coated part of optical fiber
7, 24 Solder
8, 21 Fixation pipe
9, 22 Divided sleeve
23 Opening
41 Groove
42 Planing

DETAILED DESCRIPTION OF THE INVENTION

The favorable examples of the present invention will be explained in detail hereinafter.

Although the following embodiments exemplify an optical modulator as optical element, it goes without saying that, beyond the optical modulator, the present invention can be applied to the modulation of various optical elements, such as light source like semiconductor laser, and photo detector.

FIG. 2 is the section view of the optical modulator module applying the present invention, and as in FIG. 1, it explains the structure related to the optical modulator 1 and the optical fiber 5 adjacent to the side plate 11 of the case 10. As to the member that is also used in FIG. 1, same reference letters are attached to in FIG. 2.

As described in FIG. 2, the fixation pipe 21 is fixed in the side plate of the case 11, and the optical fiber 5 is inherent placed inside said fixation pipe.

In the intermediate part of the fixation pipe (it is not necessary to be set up exactly in the middle of the pipe), the opening 23 is formed, and in case of solder fixation, the solder is inserted into the fixation pipe 21 from said opening 23, and fixes/seals the space between inner wall of the fixation pipe and the optical fiber 5.

Concerning the solder fixation part, in order to improve the joint ability with the solder, it is preferable to administer metalization processing, such as covering optical fiber by metal coat.

In the other edge (the opposite side of the case) of the fixation pipe 21, the coated part 6 of optical fiber is pinched and held thorough the divided sleeve 22. By pinching with divided sleeve, it is possible to hold the optical fiber in the center of the fixation pipe 21. Further, a fiber sleeve that is not indicated in the figures may be configured to be installed in the outer circumference of said coated part, and to be pinched by the divided sleeve if required.

FIG. 3 shows the practical example of the fixation pipe 21 as indicated in FIG. 2.

FIG. 3(a) is the section view of the fixation pipe, 41 is the groove for connecting a copper bit, 42 is the planing for alignment of a solder, and 23 is an opening.

Particularly, as the shape of the groove for copper bit 41, it is possible to form it on the whole 41', or the portion 41", of circumference surface of the fixation pipe as in FIG. 3(b) or (c).

In addition, by using a ring-shaped solder, workability, position, and reliability of joint will be improved.

The method for alignment of the solder using the planing 42 will be explained.

Firstly, the optical fiber is inserted into the fixation pipe from the right side of FIG. 3(a) with a solder (not shown in the figures) being attached to the strip part from which the coated part of optical fiber is removed. The front edge of the strip part penetrates into the fixation pipe, but the solder stops at the planing 42. As to the solder hereinabove, various shapes, such as paste, ring, and sheet, can be used.

A method for fusing the solder is performed by connecting the copper bit to the groove 41 (41' or 41"). Since the thickness of the fixation pipe is thinned down as much as the groove is formed, the heat made by the copper bit is conveyed effectively to the solder.

Also, as the copper bit, not only the one, the metal on edge of which generates heat, but also the one that comprises a function as electrodes, and generates Joule heat from the current flowing inside the fixation pipe by electrifying the fixation pipe, as shown in FIG. 4, can be used.

In particular, the electrode part 50 of a catalytic current copper bit is connected to the groove of the fixation pipe 21, and after electrification of predetermined time by the power source 51, the switch 52 is opened up. The electrification time is performed by controlling the gating of the switch 52 with the switch controlling circuit 53. As to the switch controlling circuit 53, for example, by using a timer and a relay switch, the relay switch is configured to be activated only for the time period set in the timer. In particular, by setting the minimum necessary time for fusing the solder thoroughly as the above-mentioned electrification time, it can present the possibility of controlling the temperature rise of the part except the groove of the fixation pipe.

Also, in the part where the groove of the fixation pipe is formed, it is possible to fuse the solder easily with small amount of heat by keeping the planing 42 adjacent to the groove 41.

The role of the groove of the fixation pipe is not only to improve the heat transfer as described above, but also to position the copper bit and prevent it from jolting out of alignment during the operation. Accordingly, the secure operations can be assured.

Although the opening 43 can be used to the same application as the opening 23 of FIG. 2 as described above, when inserting to the solder attached to the strip part of an optical fiber into the fixation pipe, it plays the role of an inspection hole for judging whether the solder is located appropriately with eyes. If the position of the solder is not proper, it is also possible to modify the position of the solder by inserting a special tool, such as a needle, from the opening 43.

In addition, if the appropriate positioning of the solder is possible at any time only by means of the inserting operation of the optical fiber, the opening 43 is not so much necessary.

The other feature related to the present invention is to refrigerate the part of the fixation pipe 21 shown by the arrow A in FIG. 2. This prevents the heat of the solder from being transferred to the coated part 6 of optical fiber through the fixation pipe and deteriorating the performance of the coated part in case of performing the solder fixation operation in the opening 23 of the fixation pipe.

In other words, it is because the heat transferred between the fixation pipe 21 from the opening 23 is refrigerated and not transferred to the coated Part 6.

The method of refrigerating the part A will be described.

As the first method, the clip-shaped endothermic member, the material of which has high thermal conductivity, such as copper, is utilized as shown in FIG. 5.

The endothermic member comprises that the clipping arms 30 and 31 are capable of turning around the fulcrum shaft 32 as the center, and that the elastic member 33, such as a spring, generates the clipping power at one edge of the clipping arms 30 or 31.

In the clipping part, the depressed portion 34, the shape of which is same as the outline of the fixation pipe, is formed so as to increase the contact area with fixation pipe.

The usage of endothermic member in FIG. 5 is that, after the part A of the fixation pipe 21 is held straight by means of the depressed portion 34, the normal operation of solder fixation is performed. Then, it is completed by removing said endothermic member from said fixation pipe 21.

The endothermic member absorbs the heat of the solder by using heat capacity of the clipping arms 30 and 31. As to the heat capacity of the clipping arms, it is basically designed to keep the temperature within the range of not affecting the performance of the coated part of optical fiber even if it absorbs the quantity of heat that is transferred in the fixation pipe during the solder fixation operation. For example, in the existing solder fixation operation shown in FIG. 1 as an indication, it is preferable to set the heat capacity at around that of the side plate of the case 11 since the heat generated at the front edge of the fixation pipe 8 that is located inside the case is absorbed mostly by the side plate of the case 11 and does not affect the coated part 6 of optical fiber.

In addition, besides the clip-shaped endothermic member as described above, it is possible to prevent the deterioration of the coated part to some extent only by forming a bar member with material having high thermal conductivity and connecting said member with the fixation pipe.

Another method of refrigerating the part A is to blow air, compressed air for example, to the part A. Particularly it is possible to send air locally by using the compressed air, and further, high cooling effect can be realized since the compressed air draws heat from the fixation pipe more effectively when it expands.

Moreover, by providing the divided sleeve 22 in FIG. 2 with insulation effectiveness, it presents the possibility of preventing the heat transferred in the fixation pipe from being transferred to the coated part 6 of optical fiber. In combination with the above-mentioned configuration, the deterioration prevention at a higher level of the coated pipe of optical fiber is made possible.

The embodiments of the present invention were described above, however, not being limited to the above-mentioned embodiments, the present invention comprises the cases which the known technique is substituted for the above-mentioned technical configuration in the relevant technical field for the purpose of preventing the deterioration of the coated part of optical fiber due to the heat of a solder in the fixation of optical fiber in an optical device module.

As described hereinbefore, by the method for fixation of optical fiber in an optical device module and the fixation pipe, it enables the miniaturization of the optical device module, the improvement of the operation efficiency related to a solder fixation in an assembly and manufacture process, and further, the deterioration prevention of the coated part of optical fiber.

What is claimed is:

1. A method for fixation of optical fiber in an optical device module, said module comprising a case with an integrated optical element, said optical fiber being installed from an exterior of said case into said optical element, comprising the steps of:
    utilizing a fixation pipe configured to receive insertion of optical fiber, and adapted for affixation of said optical fiber by means of a solder in an intermediate part of said fixation pipe, an external surface of said intermediate part of said fixation pipe comprising a groove for a copper bit;
    positioning and installing said fixation pipe to said case such that said intermediate part of said fixation pipe is positioned outside of said case;
    inserting said optical fiber inside said fixation pipe so that a stripped part, wherein a coating of said optical fiber has been removed, is positioned in said intermediate part of said fixation pipe, and a coated part of said optical fiber is positioned opposite to said case from said intermediate part; and contacting a copper bit to said groove for copper bit to affix said optical fiber to the fixation pipe by a solder.

2. A method for fixation of optical fiber in an optical device module as claimed in claim 1,
    wherein a planing for alignment of the solder is formed on an internal surface of said intermediate part of the fixation pipe, and
    comprising the further step of locating said solder on said planing when affixing said optical fiber to the fixation pipe by a solder.

3. A method for fixation of optical fiber in an optical device module as claimed in claim 2, further comprising the step of refrigerating a side of said fixation pipe that is opposite to said case, while affixing said optical fiber to the fixation pipe by a solder.

4. A method for fixation of optical fiber 1 mm optical device module as claimed in claim 2, wherein fusion of the solder is performed by electrifying the fixation pipe with said copper bit.

5. A method for fixation of optical fiber in an optical device module as claimed in claim 1, further comprising the step of refrigerating a side of said fixation pipe that is opposite to said case, while affixing said optical fiber to the fixation pipe by a solder.

6. A method for fixation of optical fiber in an optical device module as claimed in claim 5, wherein said refrigeration step is performed by contacting an endothermic member to said fixation pipe.

7. A method for fixation of optical fiber in an optical device module as claimed in claim 6, further comprising the step of clipping said endothermic member to said fixation pipe.

8. A method for fixation of optical fiber in optical device module claimed in claim 7, wherein fusion of the solder is performed by electrifying the fixation pipe with said copper bit.

9. A method for fixation of optical fiber in optical device module claimed in claim 6, wherein fusion of the solder is performed by electrifying the fixation pipe with said copper bit.

10. A method for fixation of optical fiber in an optical device module as claimed in claim 5, wherein said refrigerating step is performed by blowing compressed air to said fixation pipe.

11. A method for fixation of optical fiber in optical device module claimed in claim 10, wherein fusion of the solder is performed by electrifying the fixation pipe with said copper bit.

12. A method for fixation of optical fiber in an optical device module as claimed in claim 5, wherein fusion of the solder is performed by electrifying the fixation pipe with said copper bit.

13. A method for fixation of optical fiber in an optical device module as claimed claim 1, wherein fusion of the solder is performed by electrifying the fixation pipe with said copper bit.

14. A fixation pipe for fixing an optical fiber in an optical device module, said module comprising a case having an integrated optical element, and said optical fiber being installed from an exterior of said case into said optical element, comprising
    planing for alignment of solder formed on an internal surface of an intermediate part of said fixation pipe, and
    a groove for a copper bit formed on an external surface of an intermediate part of said fixation pipe,
    wherein said planning and said groove are located outside said case.

15. A fixation pipe as claimed in claim 14, further comprising an opening formed adjacent to said planing.

* * * * *